United States Patent
Zheng et al.

(10) Patent No.: US 12,139,184 B2
(45) Date of Patent: Nov. 12, 2024

(54) AUTONOMOUS POSITIONING METHOD FOR UNDERGROUND COAL MINE ANTI-EXPLOSION STORAGE BATTERY RAIL ELECTRIC LOCOMOTIVE

(71) Applicant: SHANGHAI SHENCHUAN ELECTRIC CO., LTD, Shanghai (CN)

(72) Inventors: Changlu Zheng, Shanghai (CN); Yifei Zheng, Shanghai (CN); Hua Zhang, Shanghai (CN)

(*) Notice: Subject to any disclaimer, the term of this patent is extended or adjusted under 35 U.S.C. 154(b) by 0 days.

(21) Appl. No.: 17/785,185

(22) PCT Filed: Jan. 22, 2022

(86) PCT No.: PCT/CN2022/073336
§ 371 (c)(1),
(2) Date: Jun. 14, 2022

(87) PCT Pub. No.: WO2022/183870
PCT Pub. Date: Sep. 9, 2022

(65) Prior Publication Data
US 2024/0190486 A1    Jun. 13, 2024

(30) Foreign Application Priority Data
Mar. 4, 2021    (CN) .......................... 202110239458.2

(51) Int. Cl.
*B61L 25/02*    (2006.01)
*B61F 19/06*    (2006.01)

(52) U.S. Cl.
CPC ............ *B61L 25/026* (2013.01); *B61F 19/06* (2013.01)

(58) Field of Classification Search
CPC .............................. B61L 25/026; B61F 19/06
See application file for complete search history.

(56) References Cited

U.S. PATENT DOCUMENTS

| | | | |
|---|---|---|---|
| 9,919,723 B2* | 3/2018 | Bhagwatkar | B61L 15/0072 |
| 10,049,298 B2* | 8/2018 | Kraeling | G06F 18/21 |
| 2014/0151460 A1* | 6/2014 | Noffsinger | B61C 15/10 |
| | | | 239/69 |
| 2016/0046308 A1* | 2/2016 | Chung | B61L 27/20 |
| | | | 701/20 |

(Continued)

*Primary Examiner* — Long T Tran

(57) ABSTRACT

The invention relates to the field of coal mine electric locomotives, and particularly discloses an autonomous positioning method for an underground coal mine anti-explosion storage battery rail electric locomotive, which comprises the following steps: constructing an underground coal mine dynamic map, scanning the surrounding environment by a laser radar at the frequency of more than 10 HZ, and transmitting data to a vehicle-mounted controller; performing dynamic map construction by the vehicle-mounted controller according to point cloud distribution map; underground electric locomotive is accurately positioned by adopting a static accurate positioning mode, a dynamic accurate positioning mode and a multi-track lateral positioning mode; through fusion of multiple dynamic positioning modes, laser radar positioning is adopted, inertial positioning and passive identification card RF ID positioning are fused, and the positioning precision of the system is greatly improved; three positioning modes are organically fused to provide system adaptability, stability and reliability.

8 Claims, 6 Drawing Sheets

(56) References Cited

U.S. PATENT DOCUMENTS

| | | | | |
|---|---|---|---|---|
| 2018/0222505 A1* | 8/2018 | Chung | ................ | B61L 15/0027 |
| 2019/0265015 A1* | 8/2019 | Michiwaki | ............... | G01B 7/16 |
| 2020/0158656 A1* | 5/2020 | Chung | .................. | G06T 7/0004 |

* cited by examiner

AUTONOMOUS POSITIONING METHOD FOR UNDERGROUND COAL MINE ANTI-EXPLOSION STORAGE BATTERY RAIL ELECTRIC LOCOMOTIVE

CROSS-REFERENCE TO RELATED APPLICATIONS

This application is a national stage filing under 35 U.S.C. § 371 of international application number PCT/CN2022/073336, filed on Jan. 22, 2022, which claims priority to Chinese patent application No. 202110239458.2, filed on Mar. 4, 2021. The contents of these applications are incorporated herein by reference in their entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC. AS A TEXT FILE OR AN XML FILE VIA THE PATENT ELECTRONIC SYSTEM

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The invention relates to a positioning system, in particular to an autonomous positioning method for underground coal mine anti-explosion storage battery rail electric locomotive.

Description of Related Art Including Information Disclosed Under 37 CFR 1.97 and 1.98

Electric locomotives are the main mode of auxiliary transportation in coal mines and undertake the important tasks of transportation of personnel, equipment, materials and so on. At present, it is completely dependent on the driver to control the electric locomotives, and human factors such as driver fatigue can easily lead to safety problems such as non-subjective over-speeding, running red lights, and rear-end collisions.

In the prior art, the coal mine electric locomotives mainly use the radio frequency fingerprint matching method to achieve positioning in use, which is mostly applied in outdoor environments or indoor places with good environments; in terms of limited space positioning, wireless positioning is mainly provided through technologies such as WiFi, Bluetooth or NFC. The accuracy of positioning needs to be improved, and the positioning accuracy of electric locomotives is not accurate enough, which may easily lead to electric locomotive accidents. The braking system of the electric locomotive is also one of the main reasons for the accident, during the running of the electric locomotive, the electric locomotive cannot clean up the debris on the track, thereby the coal debris accumulated on the track will affect the normal use of the wheels and braking parts, in severe cases, the electric locomotive may be derailed.

BRIEF SUMMARY OF THE INVENTION

Aiming at the problems in the prior art, the invention provides an autonomous positioning method for underground coal mine anti-explosion storage battery rail electric locomotive.

The invention can be achieved by adopting following technical schemes.

An autonomous positioning method for underground coal mine anti-explosion storage battery rail electric locomotive, comprising following steps S1 through S3.

In step S1, an underground coal mine dynamic map is constructed, a surrounding environment is scanned by a laser radar at the frequency of more than 10 HZ, data is transmitted to a vehicle-mounted controller, and dynamic map construction is performed by the vehicle-mounted controller according to point cloud distribution map.

In step S2, underground electric locomotive is accurately positioned by adopting a static accurate positioning mode, a dynamic accurate positioning mode and a multi-track lateral positioning mode.

In step S3, through fusion of multiple dynamic positioning modes, when underground electric locomotives are running normally, laser radar positioning is mostly adopted, and inertial positioning is adopted in the section where the roadway features are not obvious and where laser radar cannot distinguish effectively; passive identification card RFID calibration is used at key points in the roadway, and a variety of dynamic positioning technologies are fused to achieve autonomous positioning of electric locomotives.

The electric locomotive comprises braking mechanism, the braking mechanism comprises wheels and braking disc, electric locomotive is equipped with multiple wheels on both sides of the bottom, the braking disc is connected to axle of the electric locomotive through stationary shaft, and wheels are arranged at one end of the braking disc away from the axle.

An insertion board is arranged at bottom of one end of the electric locomotive, and two push plates that can move horizontally are arranged on the end of the electric locomotive above the insertion board, one end of the push plate is connected with a horizontal rod, and a mounting groove is provided below the interior of the electric locomotive, one end of the horizontal rod extends to the inside of the mounting groove and is connected with inner end of the mounting groove through multiple tension springs, inner walls at both sides of the mounting groove are provided with sliding rail along length direction, both sides of the horizontal rod are provided with chute matching with the slide rail along the length direction, and the sliding rail is slidely arranged inside the chute, one end of the horizontal rod away from the push plate is connected with a vertical rod on both sides of the bottom, the bottom of one side of the vertical rod away from the push plate is rotatably arranged with a roller, and a first air bag is arranged between one end of the inner mounting groove near the push plate and the vertical rod, the bottom of the first air bag is connected to multiple blast pipes; a crushing rod is rotatably arranged on both sides of the bottom of the electric locomotive, the top of the crushing rod extends into the mounting groove and is connected with a gear internally, and outer wall of the horizontal rod is connected with a rack that meshes with the gear.

Multiple supporting rods are connected to the outside of the stationary shaft close to one end of the push plate along the circumferential direction, and an end hammer is connected to the end of the supporting rod away from the stationary shaft, the end hammer can be in contact with the roller.

Preferably, the specific steps of underground coal mine dynamic map construction in S1 are as follows: scanning underground roadway by laser radar, and transforming 3D object distribution into point cloud image; environmental feature extraction; and feature matching and alignment.

During the environmental feature extraction, the vehicle-mounted controller process the point cloud image and extract environmental features, such as roadway wall features, track features, special markers, etc.

During the feature matching and alignment, the speed of the electric locomotive is known, which is sent to the vehicle-mounted controller in real time through CAN communication; the point cloud image generated by the laser radar contains coordinates of the object (x, y, z, roll, pitch, yaw), which are the three-dimensional coordinates x, y, z, respectively, x rotation angle, y rotation angle, z rotation angle.

When the electric locomotive is moving, while the feature extraction is carried out within the radar scanning range, it is necessary to compare and match in different positions by combining the speed of the electric locomotive and the RFID identification card, and establishes the map model of the underground roadway in coal mine in turn.

The static accurate positioning in S2 is as follows:

UWB positioning is used in the following two situations: I: in a stationary state, the static error of UWB positioning is small (less than 30 cm); II: the electric locomotive is just turned on, when the electric locomotive is just turned on, the laser radar is just turned on, and cannot accurately determine its own position, UWB positioning is used at this time, and dynamic accurate positioning is used when the running speed of the electric locomotive increases.

Preferably, the dynamic accurate positioning in S2 comprises positioning based on laser radar dynamic map, inertial positioning and passive identification card RFID calibration; the positioning process based on the laser radar dynamic map is similar to the map construction process, and the main processes are as follows:

① scanning underground roadway by laser radar, and transforming 3D object distribution into point cloud image;

② environmental feature extraction; and

③ feature matching and alignment, matching the extracted environmental features with the established map model to achieve accurate positioning.

Specifically, the inertial positioning includes: sending rotational speed and direction to unmanned controller through controller area network (CAN), and the controller can calculate running distance of the electric locomotive according to the running direction and rotation speed.

The passive identification card RFID calibration is as follows: the passive identification card RFID is used for positioning and calibration at where the roadway features are not obvious or at the key positions of the roadway, such as the turning of the roadway, the speed limit section, and the forbidden section, etc.; the passive identification card RFID is arranged in the middle of the underground roadway track, and mine intrinsically safe card reader is placed at the bottom of the electric locomotive to scan the passive identification card RFID; each passive identification card RFID has an unique address information ID, RFID cards are placed at key points in the roadway according to created map; during the operation of the electric locomotive, the RFID card is scanned by mine intrinsically safe card reader, and built-in address code of the RFID is sent to the unmanned controller through tcp/ip protocol, the controller reversely analyzes the position of the electric locomotive, thereby calibrating the laser radar positioning and carrying out radar positioning and RFID positioning of key points in the roadway to improve the reliability of the autonomous positioning system.

The multi-track lateral positioning adopts passive identification card RFID technology; passive identification card RFID with track identification information is arranged at intervals in the middle of each track, when the electric locomotive is running, vehicle-mounted card reader scans the corresponding RFID in turn, therefore the vehicle-mounted unmanned controller can judge the specific track and achieve horizontal positioning.

The electric locomotive comprises braking mechanism, the braking mechanism comprises wheels and braking disc, electric locomotive is equipped with multiple wheels on both sides of the bottom, the braking disc is connected to axle of the electric locomotive through stationary shaft, and wheels are arranged at one end of the braking disc away from the axle.

Preferably, the end hammer is spherical, and the roller is arranged between the end hammer and the push plate, the blast pipe is inclined at the bottom of the first air bag, and the air outlet of the blast pipe faces the wheels.

Preferably, upper portion of the crushing rod is rotatably connected with the electric locomotive by bearing, and the outer wall below the crushing rod is connected with a spiral crushing knife.

Preferably, one end of the push plate towards the electric locomotive is connected with a sleeve, the sleeve is sleeved outside bearing rod, the other end of the bearing rod is fixedly connected with the electric locomotive, and the horizontal rod penetrates through the bearing rod.

Preferably, the bottom of the electric locomotive is provided with a loading box, both ends of the loading box are provided with a mounting rod, the mounting rod is arranged externally with multiple cameras, and both sides of the electric locomotive are rotatably arranged with a side plate.

Preferably, both sides of the top of the side plate are connected with first stand, the first stand is rotatably connected with the side wall of the electric locomotive, hydraulic cylinder is rotatably provided above one side of the side plate close to the electric locomotive through second stand, the other end of the hydraulic cylinder is connected to the electric locomotive, a second air bag is also provided below one side of the side plate close to the electric locomotive, the side plate is provided with storage groove at both sides of the second air bag, and force-bearing rod is rotatably arranged inside the storage groove, one end of the force-bearing rod away from the hydraulic cylinder is rotatably connected to the side plate through a pin shaft, the other end of the force-bearing rod is magnetically attached to magnet plate, and the magnet plate is fixedly connected with upper part of the inside of the storage groove.

Preferably, a braking clamp is clamped outside of the braking disc, the braking clamp is fixedly connected with the electric locomotive; and the top end of the electric locomotive is provided with a control box for arranging electrical components.

Advantageous effects of the invention are as follows.

1. By arranging the push plate and the insertion board, during the rotation of the wheels, the end hammer at the end of the supporting rod is in contact with the roller, which pushes the roller, and then drives the vertical rod and the horizontal rod to move to one end of the insertion board, thereby driving the push plate to move. After the end hammer is separated from the roller, the tension springs pull the push plate to move toward the electric locomotive, and the vertical rod and the horizontal rod return to their original positions. The forward and backward movement of the push plate can push the accumulated debris in front of the electric locomotive and push the debris down, and then the insertion board at the bottom of the electric locomotive can remove the debris on the moving track of the electric locomotive, thereby avoiding the debris affecting normal operation of the electric locomotive.

2. By arranging the first air bag, the first air bag is compressed when the vertical rod moves to the crushing rod in the interior of the mounting groove, thereby the gas inside the first air bag is discharged from the blast pipes, and the discharged gas blows off the coal cinder or other debris on the track, making the track clean and tidy, and the wheels are more stable when moving on the track, and it is not easy to shake. The coal cinder will not accumulate on the track due to the extrusion of the wheels, eliminating the need for subsequent cleaning of the track, making the electric locomotive not easy to derail during operation, and improving the safety and stability. The gas inside the first air bag can enter and exit freely, which is convenient for the first air bag to be recycled.

3. By arranging the crushing rod, when the horizontal rod moves inside the mounting groove, the crushing rod can be driven to rotate. After the crushing rod is rotated, the debris on the track can be crushed, thereby the larger debris can be crushed into small particles, which is convenient for the gas discharged from the subsequent blast pipes to blow the debris, and finally makes it difficult for residual impurities to accumulate on the track, and the track is clean, and the electric locomotive runs smoothly. The cleaning process of the track is carried out at the same time as the wheels, and after the wheels are rotated, the track can be kept clean.

4. By arranging the side plate, if a failure occurs and the staff needs to enter the interior of the coal transport roadway for maintenance, the staff can use the hydraulic cylinder to support the side plate during the maintenance process, and the side plate on the upper part can prevent the objects falling from above from causing damage to the staff, especially after the collapse of the coal mine, the staff can avoid being smashed under the side plate, and the space under the side plate can provide a good shelter for the staff. Moreover, the storage of water, food and other daily necessities in the loading box can provide a good living guarantee for the staff, and the staff has a high safety guarantee when overhauling the electric locomotive. After the side plate is deployed, gas can be filled into the inside of the second air bag, and the second air bag has a buffering effect after being deployed, thereby the protective effect of the side plate is better.

5. The invention adopts laser radar positioning, and integrates inertial positioning and passive identification card RFID positioning, which greatly improves the positioning accuracy of the system (within 30 CM). Laser radar positioning is used for roadway sections where roadway environmental features are easy to distinguish; inertial positioning is mainly used in areas where roadway environmental features are not obvious and there is no RFID identification card section; passive identification card RFID positioning is used in key positions of roadway (turning of the roadway, the speed limit section, and the forbidden section, etc.), to calibrate the laser radar positioning and inertial positioning. Organic integration through three positioning methods provides adaptability, stability and reliability of the system.

The accurate positioning technology of electric locomotives provides strong technical support for the realization of auxiliary driving and autonomous driving of electric locomotives in coal mines, and is of great significance to the construction of smart mines, coal mines to reduce people and increase efficiency, and to improve the safety performance of auxiliary transportation.

BRIEF DESCRIPTION OF THE SEVERAL VIEWS OF THE DRAWINGS

In order to facilitate the understanding of those skilled in the art, the invention will be further described below with reference to the accompanying drawings.

Figure 1:
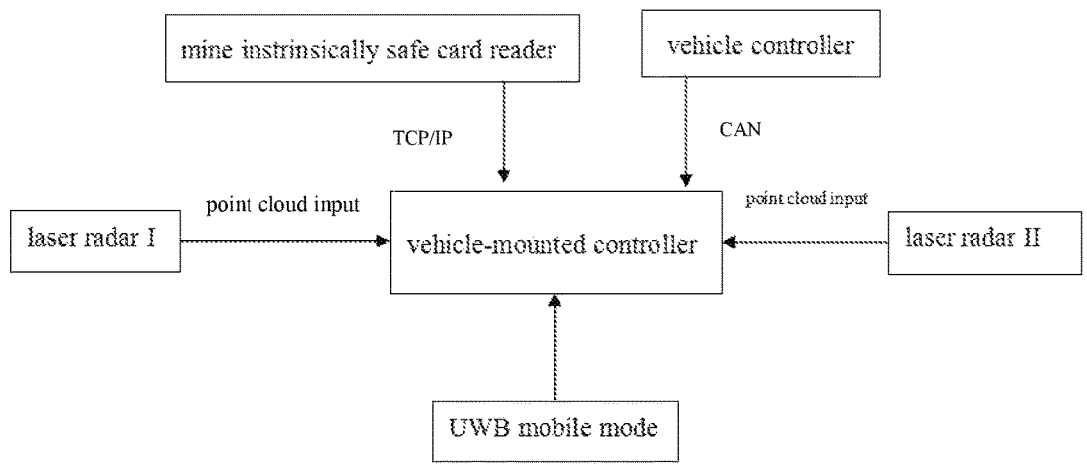
FIG. 1 shows a block diagram of an autonomous positioning method for underground coal mine electric locomotive of the invention.
Figure 2:
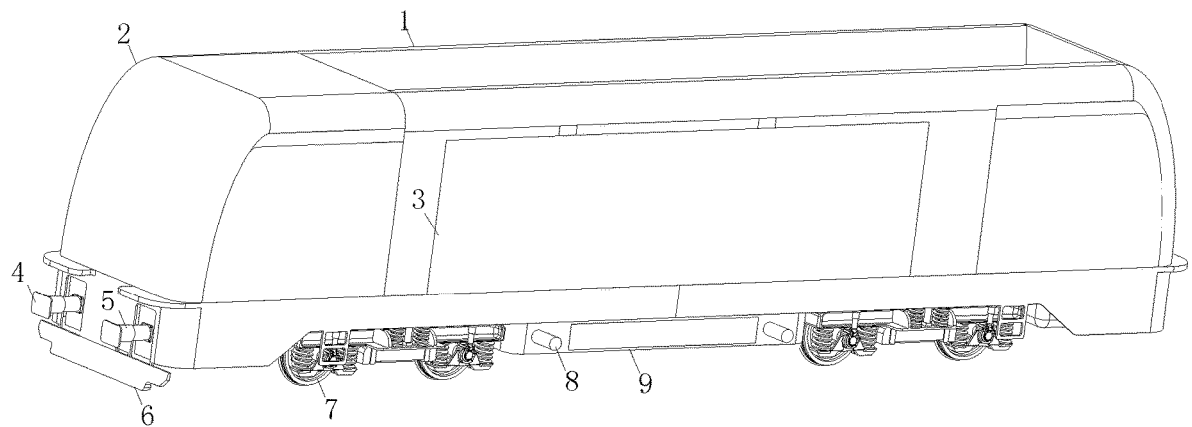
FIG. 2 shows the overall structure of the electric locomotive of the invention.
Figure 3:
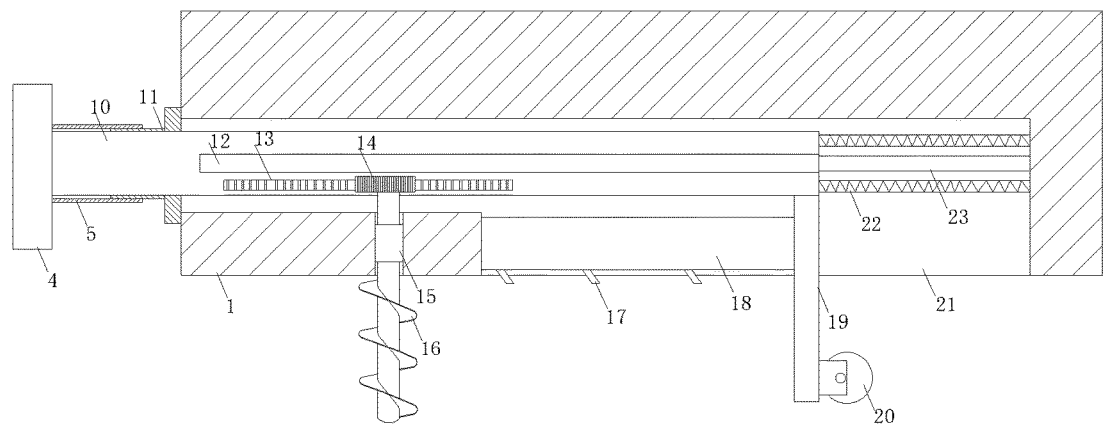
FIG. 3 shows the mounting structure of the push plates and the electric locomotive in the invention.
Figure 4:
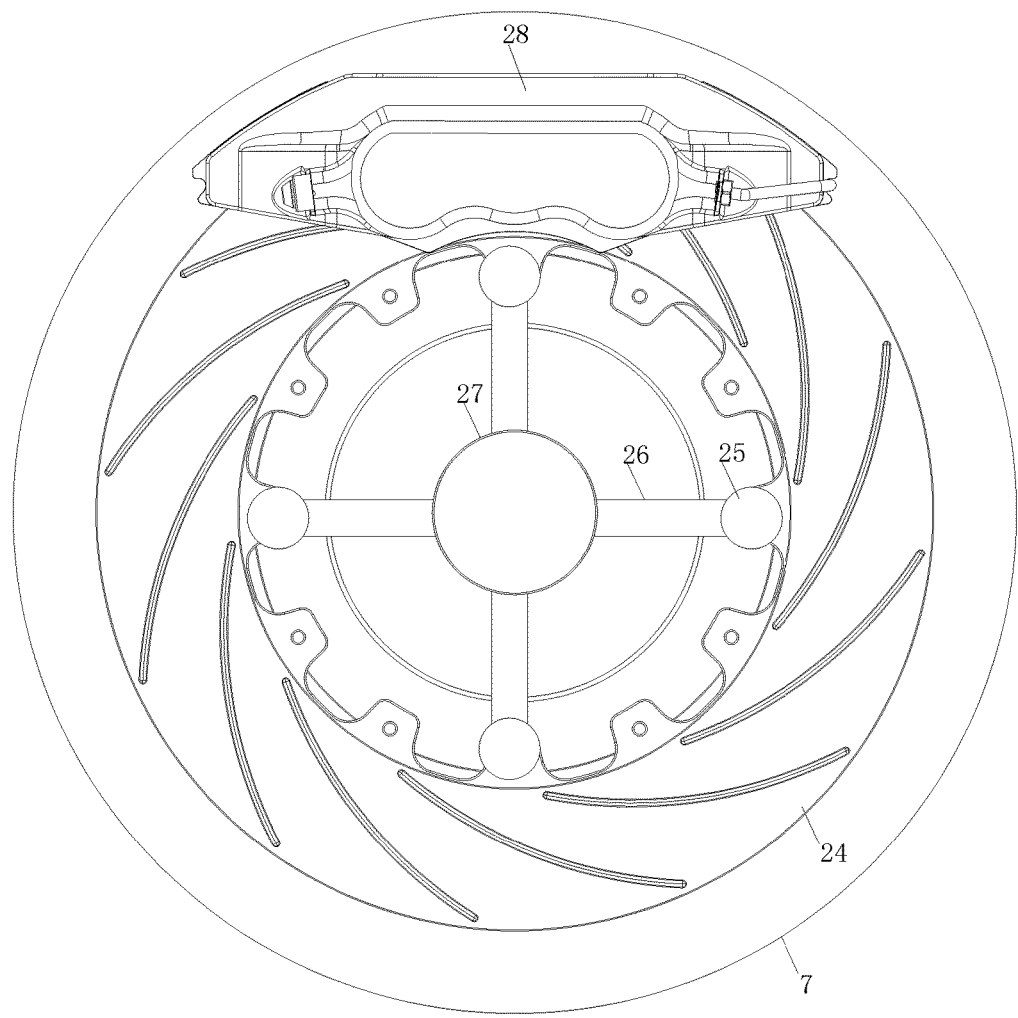
FIG. 4 shows the mounting structure of the supporting rods of the invention.
Figure 5:
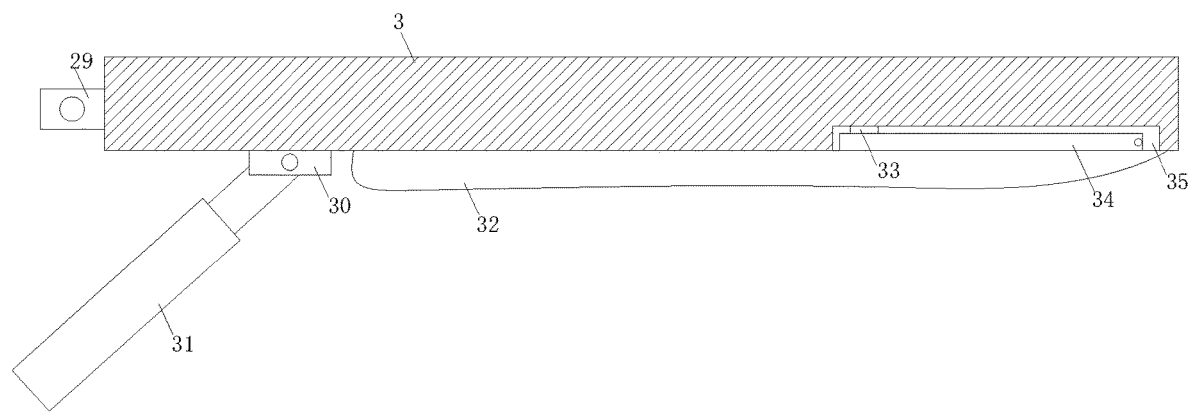
FIG. 5 shows the structure of the side plate of the invention.

In the accompanying drawings: 1, electric locomotive; 2, control box; 3, side plate; 4, push plate; 5, sleeve; 6, insertion board; 7, wheel; 8, mounting rod; 9, loading box; 10, horizontal rod; 11, bearing rod; 12, chute; 13, rack; 14, gear; 15, bearing; 16, crushing rod; 17, blast pipe; 18, first air bag; 19, vertical rod; 20, roller, 21, mounting groove; 22, tension spring; 23, sliding rail; 24, braking disc; 25, end hammer; 26, supporting rod; 27, stationary shaft; 28, braking clamp; 29, first stand; 30, second stand; 31, hydraulic cylinder; 32, second air bag; 33, magnet plate; 34, force-bearing rod; 35, storage groove.

DETAILED DESCRIPTION OF THE INVENTION

The technical schemes of the invention will be clearly and completely described below with reference to the embodiments, obviously, the described embodiments are only a part of the embodiments of the invention, rather than all the embodiments. Based on the embodiments of the invention, all other embodiments obtained by those of ordinary skill in the art without creative efforts shall fall within the protection scope of the invention.

As shown in FIG. 1-9, an autonomous positioning method for underground coal mine anti-explosion storage battery rail electric locomotive, the positioning method comprises the following steps S1 through S3.

In step S1, an underground coal mine dynamic map is constructed, a surrounding environment is scanned by a laser radar at the frequency of more than 10 HZ, data is transmitted to a vehicle-mounted controller, and dynamic map construction is performed by the vehicle-mounted controller according to point cloud distribution map.

In step S2, underground electric locomotive is accurately positioned by adopting a static accurate positioning mode, a dynamic accurate positioning mode and a multi-track lateral positioning mode.

In step S3, through fusion of multiple dynamic positioning modes, when underground electric locomotives are running normally, laser radar positioning is mostly adopted, and inertial positioning is adopted in the section where the roadway features are not obvious and where laser radar cannot distinguish effectively; passive identification card RFID calibration is used at key points in the roadway, and a variety of dynamic positioning technologies are fused to achieve autonomous positioning of electric locomotives.

The electric locomotive comprises braking mechanism, the braking mechanism comprises wheels 7 and braking disc 24, electric locomotive 1 is equipped with multiple wheels 7 on both sides of the bottom, the braking disc 24 is connected to axle of the electric locomotive through stationary shaft 27, wheels 7 are arranged at one end of the braking disc 24 away from the axle.

An insertion board 6 is arranged at bottom of one end of the electric locomotive 1, and two push plates 4 that can move horizontally are arranged on the end of the electric locomotive 1 above the insertion board 6, one end of the push plate 4 is connected with a horizontal rod 10, and a mounting groove 21 is provided below the interior of the electric locomotive 1, one end of the horizontal rod 10 extends to the inside of the mounting groove 21 and is connected with inner end of the mounting groove 21 through multiple tension springs 22, inner walls at both sides of the mounting groove 21 are provided with sliding rail 23 along length direction, both sides of the horizontal rod 10 are provided with chute 12 matching with the slide rail 23 along the length direction, and the sliding rail 23 is slidely arranged inside the chute 12, one end of the horizontal rod 10 far from the push plate 4 is connected with a vertical rod 19 on both sides of the bottom, the bottom of one side of the vertical rod 19 away from the push plate 4 is rotatably arranged with a roller 20, and a first air bag 18 is arranged between one end of the inner mounting groove 21 near the push plate 4 and the vertical rod 19, the bottom of the first air bag 18 is connected to multiple blast pipes 17; a crushing rod 16 is rotatably arranged on both sides of the bottom of the electric locomotive 1, the top of the crushing rod 16 extends into the mounting groove 21 and is connected with a gear 14 internally, and the outer wall of the horizontal rod 10 is connected with a rack 13 that meshes with the gear 14.

Multiple supporting rods 26 are connected to the outside of the stationary shaft 27 close to one end of the push plate 4 along the circumferential direction, and an end hammer 25 is connected to the end of the supporting rod 26 away from the stationary shaft 27, the end hammer 25 can be in contact with the roller 20.

As a technical optimization scheme of the invention, the end hammer 25 is spherical, and the roller 20 is arranged between the end hammer 25 and the push plate 4, the blast pipe 17 is inclined at the bottom of the first air bag 18, and the air outlet of the blast pipe 17 faces the wheels 7, the gas inside the first air bag 18 is discharged from the blast pipes 17, and the discharged gas blows off the coal cinder or other debris on the track and wheels 7, making the track clean and tidy, and the wheels 7 are more stable when moving on the track, and it is not easy to shake.

As a technical optimization scheme of the invention, wherein upper portion of the crushing rod 16 is rotatably connected with the electric locomotive 1 by bearing 15, and the outer wall below the crushing rod (16) is connected with a spiral crushing knife.

As a technical optimization scheme of the invention, one end of the push plate 4 towards the electric locomotive 1 is connected with a sleeve 5, the sleeve 5 is sleeved outside bearing rod 11, the other end of the bearing rod 11 is fixedly connected with the electric locomotive 1, and the horizontal rod 10 penetrates through the bearing rod 11, the sleeve 5 is beneficial to the firmness of the horizontal rod 10 when the sleeve 5 moves outside the bearing rod 11, thereby the horizontal rod 10 is not easily deformed by force.

As a technical optimization scheme of the invention, the bottom of the electric locomotive 1 is provided with a loading box 9, both ends of the loading box 9 are provided with a mounting rod 8, the mounting rod 8 is arranged externally with multiple cameras, and both sides of the electric locomotive 1 are rotatably arranged with a side plate 3, the loading box 9 can store the daily necessities of the staff and some used tools. The cameras can check the bottom of the electric locomotive 1, and can check through the camera when a situation occurs.

As a technical optimization scheme of the invention, both sides of the top of the side plate 3 are connected with first stand 29, the first stand 29 is rotatably connected with the side wall of the electric locomotive 1, hydraulic cylinder 31 is rotatably provided above one side of the side plate 3 close to the electric locomotive 1 through second stand 30, the other end of the hydraulic cylinder 31 is connected to the electric locomotive 1, a second air bag 32 is also provided below one side of the side plate 3 close to the electric locomotive 1, the side plate 3 is provided with storage groove 35 at both sides of the second air bag 32, and force-bearing rod 34 is rotatably arranged inside the storage groove 35, one end of the force-bearing rod 34 away from the hydraulic cylinder 31 is rotatably connected to the side plate 3 through a pin shaft, the other end of the force-bearing rod 34 is magnetically attached to magnet plate 33, the magnet plate 33 is fixedly connected with upper part of the inside of the storage groove 35, and the side plate 3 has a protective effect on staff.

As a technical optimization scheme of the invention, a braking clamp 28 is clamped outside of the braking disc 24, the braking clamp 28 is fixedly connected with the electric locomotive 1; and the top end of the electric locomotive 1 is provided with a control box 2 for arranging electrical components.

When the invention is in use, the wheels 7 under the electric locomotive 1 are arranged on the track inside the coal mine roadway, and the battery inside the electric locomotive 1 supplies power to motor, and then the motor can drive the wheels 7 to roll on the track through the axle, thereby the electric locomotive 1 can move in the roadway of coal mine. During the rotation of the wheels 7, the supporting rod 26 rotates along with it. During the rotation of the supporting rod 26, the end hammer 25 at the end thereof is in contact with the roller 20, which pushes the roller 20, and then drives the vertical rod 19 and the horizontal rod 10 to move to one end of the insertion board 6, thereby driving the push plate 4 to move. After the end hammer 25 is separated from the roller 20, the tension springs 22 pull the push plate 4 to move toward the electric locomotive 1, and the vertical rod 19 and the horizontal rod 10 return to their original positions. The forward and backward movement of the push plate 4 can push the accumulated debris in front of the electric locomotive 1 and push the debris down, and then the insertion board 6 at the bottom of the electric locomotive 1 can remove the debris on the moving track of the electric locomotive 1, thereby avoiding the debris affecting normal operation of the electric locomotive 1.

The first air bag 18 is compressed when the vertical rod 19 moves to the crushing rod 16 in the interior of the mounting groove 21, thereby the gas inside the first air bag 18 is discharged from the blast pipes 17, and the discharged gas blows off the coal cinder or other debris on the track, making the track clean and tidy, and the wheels 7 are more stable when moving on the track, and it is not easy to shake. The coal cinder will not accumulate on the track due to the extrusion of the wheels 7, eliminating the need for subsequent cleaning of the track, making the electric locomotive not easy to derail during operation, and improving the safety and stability. When the vertical rod 19 returns to its original position, the first air bag 18 is pulled and expanded, and the external gas enters the inside of the first air bag 18 from the blast pipes 17, thereby the gas inside the first air bag 18 can enter and exit freely, which is convenient for the first air bag 18 to be recycled.

When the horizontal rod 10 moves inside the mounting groove 21, the rack 13 moves along with it, the rack 13 drives the gear 14 to rotate during the movement, and the crushing rod 16 can be driven to rotate. After the crushing rod 16 is rotated, the debris on the track can be crushed, thereby the larger debris can be crushed into small particles, which is convenient for the gas discharged from the subsequent blast pipes 17 to blow the debris, and finally makes it difficult for residual impurities to accumulate on the track, and the track is clean, and the electric locomotive 1 runs smoothly.

If the electric locomotive 1 brakes, wheel 7 no longer rotation, horizontal rod 10, vertical rod 19 and crushing rod 16 stop running, the cleaning process of the track is carried out at the same time as the wheels 7, and after the wheels 7 are rotated, the track can be kept clean.

After the vehicle is stopped, if a failure occurs and the staff needs to enter the interior of the coal transport roadway for maintenance, the staff can use the hydraulic cylinder 31 to support the side plate 3 during the maintenance process, after the side plate 3 is unfolded inside the roadway, the force-bearing rod 34 is pulled out from the interior of the storage groove 35, and the force-bearing rod 34 is in contact with the wall of the coal transport roadway, and is supported at the end of the side plate 3, thereby the side plate 3 has better stability after unfolding. The side plate 3 on the upper part can prevent the objects falling from above from causing damage to the staff, especially after the collapse of the coal mine, the staff can avoid being smashed under the side plate 3, and the space under the side plate 3 can provide a good shelter for the staff. Moreover, the storage of water, food and other daily necessities in the loading box 9 can provide a good living guarantee for the staff, and the staff has a high safety guarantee when overhauling the electric locomotive 1. After the side plate 3 is deployed, gas can be filled into the inside of the second air bag 32, and the second air bag 32 has a buffering effect after being deployed, thereby the protective effect of the side plate 3 is better.

When the electric locomotive 1 is operating on the track, it is necessary to know the position of the electric locomotive 1 on the track in real time, thereby remedial measures can be taken in time after an accident occurs. Before positioning the electric locomotive 1, it is necessary to establish a track map of the operating area of the underground mine electric locomotive, and then realize static and dynamic dual accurate positioning based on the underground track map. The static and dynamic dual accurate positioning is realized by static accurate positioning, dynamic accurate positioning and multi-track lateral positioning. The specific operations are as follows.

1. Constructing an Underground Coal Mine Dynamic Map

The surrounding environment is scanned by a laser radar at the frequency of more than 10 HZ, data is transmitted to a vehicle-mounted controller, dynamic map construction is performed by the vehicle-mounted controller according to point cloud distribution map. The step includes: scanning underground roadway by laser radar, and transforming 3D object distribution into point cloud image; environmental feature extraction; and feature matching and alignment.

During the environmental feature extraction, the vehicle-mounted controller processes the point cloud image and extracts environmental features, such as roadway wall features, track features, special markers, etc.

During the feature matching and alignment, the speed of the electric locomotive is known, which is sent to the vehicle-mounted controller in real time through CAN communication. The point cloud image generated by the laser radar contains coordinates of the object (x, y, z, roll, pitch, yaw), which are the three-dimensional coordinates x, y, z, respectively, x rotation angle, y rotation angle, z rotation angle.

Figure 6:
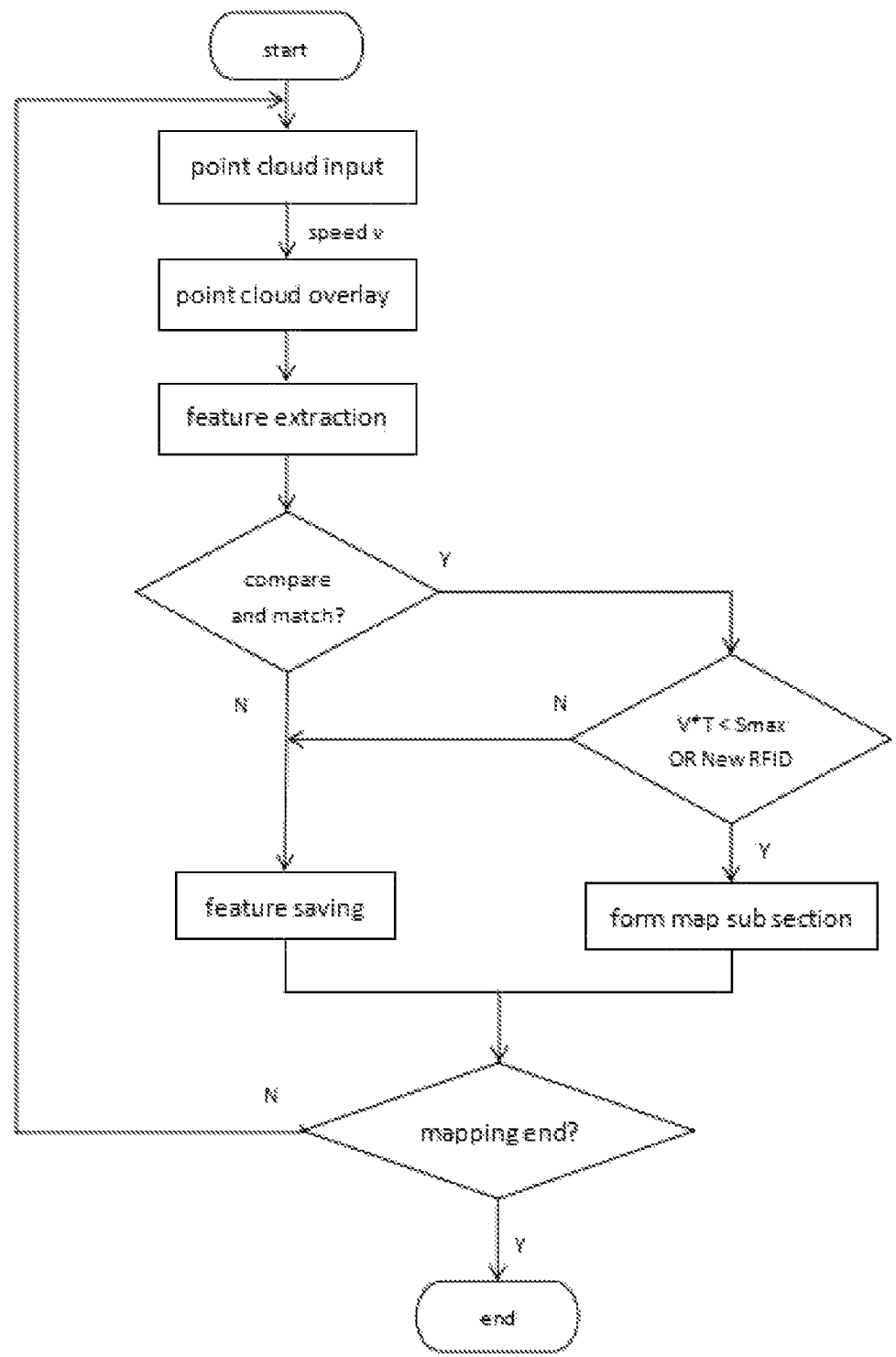
FIG. 6 shows a flow chart of the dynamic map construction of the invention.
Figure 7:
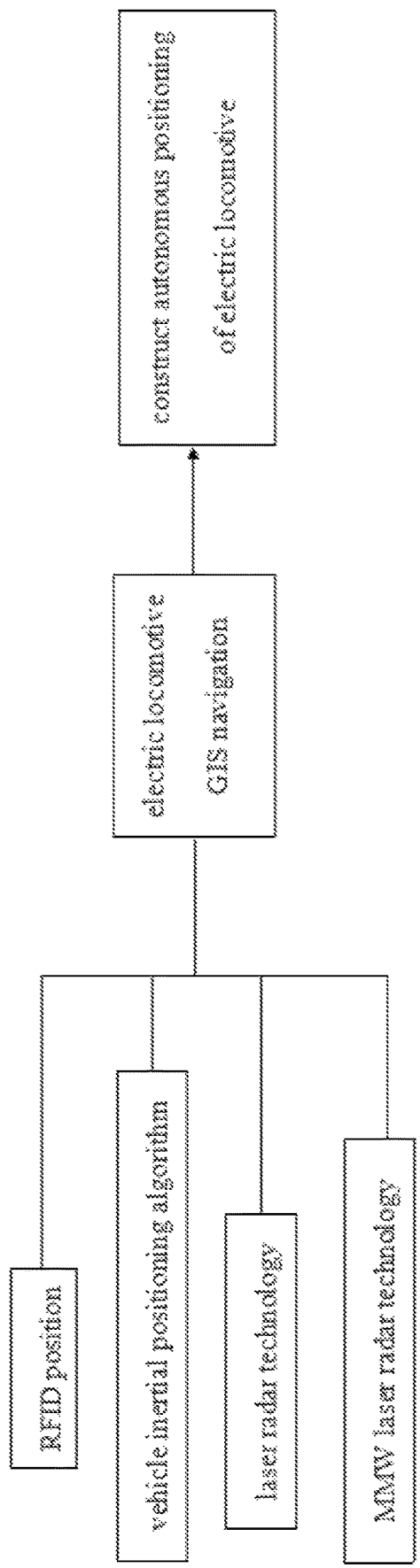
FIG. 7 shows the combination of various dynamic positioning methods of the invention.
Figure 8:
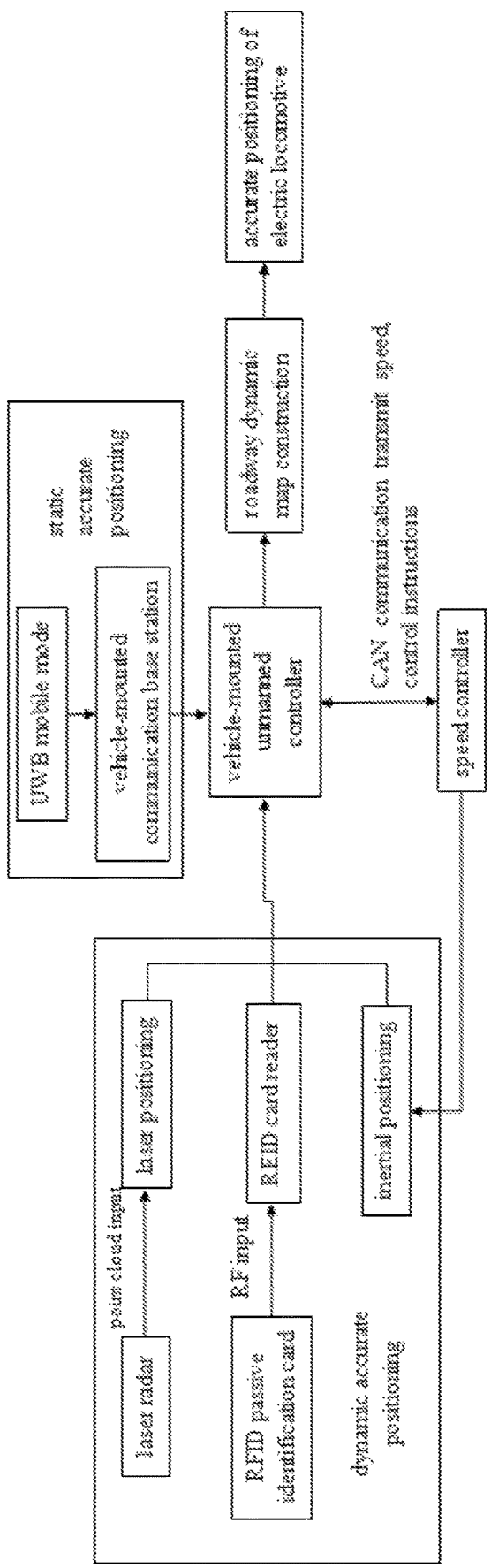
FIG. 8 shows a block diagram of autonomous positioning of underground coal mine electric locomotive of the invention.
Figure 9:
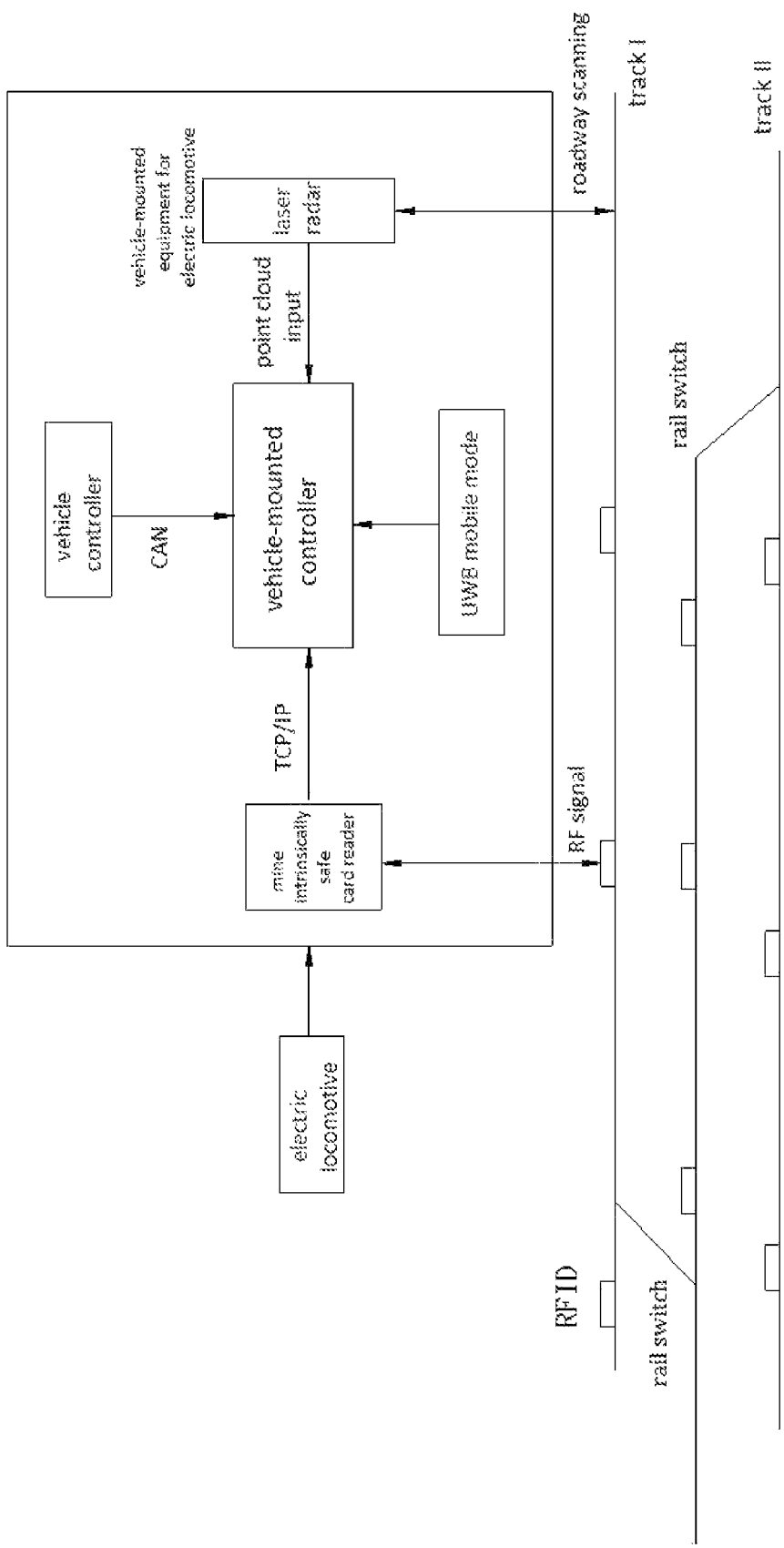
FIG. 9 shows electric locomotive track running system of the invention.

Different from the ground construction, there are not obvious features in underground coal mine, when the electric locomotive is moving, while the feature extraction is carried out within the radar scanning range, it is necessary to compare and match in different positions by combining the speed of the electric locomotive and the RFID identification card, and establishes the map model of the underground roadway in coal mine in turn. FIG. 6 shows a flow chart of the dynamic map construction.

2. Accurate Positioning of Underground Electric Locomotive 2.1 Static Accurate Positioning UWB positioning is used in the following two situations.

In one situation, the electric locomotive is in a stationary state, the static error of UWB positioning is small (less than 30 cm), and UWB positioning meets system requirements.

In the other situation, the electric locomotive is just turned on.

When the electric locomotive is just turned on, the laser radar is just turned on, and cannot accurately determine its own position, UWB positioning is used at this time, and dynamic accurate positioning is used when the running speed of the electric locomotive increases.

2.2 Dynamic Accurate Positioning 2.2.1. Positioning Process Based on the Laser Radar Dynamic Map The positioning process based on the laser radar dynamic map is similar to the map construction process, and the main processes are as follows:

① scanning underground roadway by laser radar, and transforming 3D object distribution into point cloud image;

② environmental feature extraction; and

③ feature matching and alignment, matching the extracted environmental features with the established map model to achieve accurate positioning.

2.2.2. Inertial Positioning

The rotational speed of the electric locomotive is known, send rotational speed and direction to unmanned controller through controller area network (CAN), and the controller can calculate running distance of the electric locomotive according to the running direction and rotation speed; The CAN speed and direction frame transmission period is 20 ms and 500 Kbps, which has the advantages of high real-time performance and reliable positioning, it is mainly used in the RFID section without passive identification card, and in combination with laser radar positioning.

2.2.3. Passive Identification Card RFID Calibration

The passive identification card RFID is used for positioning and calibration at where the roadway features are not obvious or at the key positions of the roadway (such as the turning of the roadway, the speed limit section, and the forbidden section, etc.).

The passive identification card RFID is arranged in the middle of the underground roadway track, and mine intrinsically safe card reader is placed at the bottom of the electric locomotive to scan the passive identification card RFID. Each passive identification card RFID has an unique address information ID, RFID cards are placed at key points in the roadway according to created map. During the operation of the electric locomotive, the RFID card is scanned by mine intrinsically safe card reader, and built-in address code of the RFID is sent to the unmanned controller through tcp/ip protocol, the controller reversely analyzes the position of the electric locomotive, thereby calibrating the laser radar positioning and carrying out double judgment on key points in the roadway (radar positioning and RFID positioning) to improve the reliability of the autonomous positioning system.

2.3 Multi-Track Lateral Positioning

The multi-track lateral positioning adopts passive identification card RFID technology. Passive identification card RFID with track identification information is arranged at intervals in the middle of each track, when the electric locomotive is running, vehicle-mounted card reader scans the corresponding RFID in turn, therefore the vehicle-mounted unmanned controller can judge the specific track and achieve horizontal positioning.

2.4 Fusion of Multiple Dynamic Positioning Modes

When underground electric locomotives are running normally, laser radar positioning is mostly adopted, and inertial positioning is adopted in the section where the roadway features are not obvious and where laser radar cannot distinguish effectively. Passive identification card RFID calibration is used at key points in the roadway, and a variety of dynamic positioning technologies are fused to improve the positioning accuracy and reliability of the system and adapt to different industrial and mining environments.

The preferred embodiments of the invention disclosed above are only used to explain the invention. The preferred embodiments do not describe all the details of the invention nor do limit the invention to the specific embodiments described. Obviously, according to the contents of this specification, many modifications and changes can be made. The purpose of selecting and describing the embodiments in the specification is to better explain the principle and practical application of the invention, thereby those skilled in the art can well understand and utilize the invention. The invention is limited only by the claims and the full scope and equivalence thereof.

The invention claimed is:

1. An autonomous positioning method for underground coal mine anti-explosion storage battery rail electric locomotive, comprising following steps:

S1, constructing an underground coal mine dynamic map, scanning a surrounding environment by a laser radar at a frequency of more than 10 HZ, and transmitting data to a vehicle-mounted controller, performing dynamic map construction by the vehicle-mounted controller according to point cloud distribution map;

S2, positioning accuracy of an underground electric locomotive, positioning by a static accurate positioning mode, a dynamic accurate positioning mode and a multi-track lateral positioning mode;

S3, integrating multiple dynamic positioning modes, when the underground electric locomotive is running normally, positioning by the laser radar is adopted, and inertial positioning is adopted in a section where roadway features are not obvious and where the laser radar cannot distinguish effectively; using passive Radio Frequency Identification (RFID) identification card calibration at key points in a roadway, and the integrating multiple dynamic positioning modes are fused to achieve autonomous positioning of the underground electric locomotive; wherein, the underground electric locomotive comprises a braking mechanism, the braking mechanism comprises wheels and a braking disc, the underground electric locomotive is equipped with the wheels on both sides of bottom, the braking disc is connected to an axle of the underground electric locomotive through a stationary shaft, and the wheels are arranged at one end of the braking disc away from the axle;

an insertion board is arranged at bottom of one end of the underground electric locomotive, and two push plates that are capable of moving horizontally are arranged on end of the underground electric locomotive above the insertion board, one end of each push plate is connected with a horizontal rod, and a mounting groove is provided below the interior of the underground electric locomotive, one end of the horizontal rod extends to the inside of the mounting groove and is connected with inner end of the mounting groove through multiple tension springs, inner walls at both sides of the mounting groove are provided with a sliding rail along a length direction, both sides of the horizontal rod are provided with a chute matching with the sliding rail along the length direction, and the sliding rail is slidely arranged inside the chute, one end of the horizontal rod far from the push plate is connected with a vertical rod on both sides of bottom, bottom of one side of the vertical rod away from the push plate is rotatably arranged with a roller, and a first air bag is arranged between one end of the mounting groove near the push plate and the vertical rod, bottom of the first air bag is connected to multiple blast pipes; a crushing rod is rotatably arranged on both sides of bottom of the underground electric locomotive, top of the crushing rod extends into the mounting groove and is connected with a gear internally, and an outer wall of the horizontal rod is connected with a rack that meshes with the gear; and multiple supporting rods are connected to outside of the stationary shaft close to one end of the push plate along a circumferential direction, and an end hammer is connected to an end of each supporting rod away from the stationary shaft, the end hammer is connected with the roller.

2. The autonomous positioning method for underground coal mine anti-explosion storage battery rail electric locomotive of claim 1, wherein specific steps of constructing an underground coal mine dynamic map in the step S1 are as follows:

scanning an underground roadway by the laser radar, and transforming three-dimensional (3D) object distribution into a point cloud image, wherein the point cloud image generated by the laser radar contains coordinates of an object (x, y, z, roll, pitch, yaw), and the coordinates respectively represent three-dimensional coordinates x, y, z, x rotation angle, y rotation angle, z rotation angle;

extracting environmental features, comprising:
processing the point cloud image by the vehicle-mounted controller and
extracting the environmental features comprising roadway wall features, track features, and special markers;

matching and aligning features, comprising:
sending a speed of the underground electric locomotive to the vehicle-mounted controller in real time by Controller Area Network (CAN) communication;
moving the underground electric locomotive, while feature extraction for the environmental features is carried out within a radar scanning range, comparing and matching in different positions by combining the speed of the underground electric locomotive and a passive RFID identification card, and establishing a map model of the underground roadway in coal mine in turn; and wherein in the static accurate positioning mode in the step S2, Ultra Wide Band (UWB) positioning is used in the following two situations: when the underground electric locomotive is in a stationary state, a static error of UWB positioning is less than 30 cm; and the laser radar is just turned on when the underground electric locomotive is just turned on, own position cannot be accurately determined, using the UWB positioning at this time, and using dynamic accurate positioning when a running speed of the underground electric locomotive increases.

3. The autonomous positioning method for underground coal mine anti-explosion storage battery rail electric locomotive in claim 1, wherein the end hammer is spherical, the roller is arranged between the end hammer and the push plate, a blast pipe is inclined at the bottom of the first air bag, and an air outlet of the blast pipe faces the wheels.

4. The autonomous positioning method for underground coal mine anti-explosion storage battery rail electric locomotive in claim 3, wherein an upper portion of the crushing rod is rotatably connected with the underground electric locomotive by a bearing, and the outer wall below the crushing rod is connected with a spiral crushing knife.

5. The autonomous positioning method for underground coal mine anti-explosion storage battery rail electric locomotive in claim 4, wherein one end of the push plate towards the underground electric locomotive is connected with a sleeve, the sleeve is sleeved outside a bearing rod, the other end of the bearing rod is fixedly connected with the underground electric locomotive, and the horizontal rod penetrates through the bearing rod.

6. The autonomous positioning method for underground coal mine anti-explosion storage battery rail electric locomotive in claim 5, wherein bottom of the underground electric locomotive is provided with a loading box, both ends of the loading box are provided with a mounting rod, the mounting rod is arranged externally with multiple cameras, and both sides of the underground electric locomotive are rotatably arranged with a side plate.

7. The autonomous positioning method for underground coal mine anti-explosion storage battery rail electric locomotive in claim 6, wherein both sides of top of the side plate are connected with a first stand, the first stand is rotatably connected with a side wall of the underground electric locomotive, a hydraulic cylinder is rotatably provided above one side of the side plate close to the underground electric locomotive through second stand, the other end of the hydraulic cylinder is connected to the underground electric locomotive, a second air bag is also provided below one side of the side plate close to the underground electric locomotive, the side plate is provided with a storage groove at both sides of the second air bag, and a force-bearing rod is rotatably arranged inside the storage groove, one end of the force-bearing rod away from the hydraulic cylinder is rotatably connected to the side plate through a pin shaft, the other end of the force-bearing rod is magnetically attached to a magnet plate, and the magnet plate is fixedly connected with upper part of the inside of the storage groove.

8. The autonomous positioning method for underground coal mine anti-explosion storage battery rail electric locomotive in claim 7, wherein a braking clamp is clamped outside of the braking disc, the braking clamp is fixedly connected with the underground electric locomotive; and a top end of the underground electric locomotive is provided with a control box for arranging electrical components.

* * * * *